United States Patent [19]
Miller et al.

[11] Patent Number: 5,648,416
[45] Date of Patent: Jul. 15, 1997

[54] CORROSION RESISTANT PAINT

[75] Inventors: Granville G. Miller, Birmingham, Ala.; Lawrence W. Shacklette, Essex, N.J.; Ronald L. Elsenbaumer, Tarrant, Tex.; Bernhard Wessling, Bargteheide, Germany; Peter Whang, Morris, N.J.; Vaman G. Kulkarni, Mecklenburg, N.C.

[73] Assignee: Monsanto Company, St. Louis, Mo.

[21] Appl. No.: 452,244

[22] Filed: May 26, 1995

Related U.S. Application Data

[63] Continuation of Ser. No. 832,511, Jan. 21, 1992, abandoned.

[51] Int. Cl.$^6$ .................... C08L 65/02; C08L 79/04
[52] U.S. Cl. .................... 524/500; 524/502; 524/540; 525/185; 525/540
[58] Field of Search .................... 525/185, 540; 524/502, 500, 540

[56] References Cited

U.S. PATENT DOCUMENTS

| | | | |
|---|---|---|---|
| 5,232,631 | 8/1993 | Cao et al. | 252/500 |
| 5,281,363 | 1/1994 | Shacklette et al. | 252/500 |

FOREIGN PATENT DOCUMENTS

| | | |
|---|---|---|
| WO88/00798 | 2/1988 | WIPO . |
| WO90/01694 | 2/1989 | WIPO . |
| WO90/10297 | 9/1990 | WIPO . |

OTHER PUBLICATIONS

Lee, L–H, "Adhesives, Sealants and Coatings For Space and Harsh Environments", Polymer Science and Technology, vol. 37, pp. 381–404, (1988).

Berlouis, L.E.A., "Recent Advantages In Electrochemical Polymerisation For Surface Coating", Wolson Centre for Electro–chemical Science, University of Southampton, 64, pp. 42–46 (1986).

Backsai, R., "Hydrocarbon–Soluble Alkylaniline/Formaldehyde Oligomers As Corrosion Inhibitors", Chevron Research Company, vol. 42, pp. 2435–2441, (1991).

Primary Examiner—Ana Woodward
Attorney, Agent, or Firm—Howell & Haferkamp, L.C.

[57] ABSTRACT

This invention relates to an improved anti-corrosion paint of the type comprising one or more polymeric binders dispersed in a liquid medium, said improvement comprising an anti-corrosion effective amount of one or more nonconductive conjugated polymers.

18 Claims, No Drawings

CORROSION RESISTANT PAINT

This application is a continuation of application Ser. No. 07/832,511, filed Jan. 21, 1992 now abandoned.

BACKGROUND OF THE INVENTION

1. Field of the Invention

This invention relates to anti-corrosive paints for metals. More particularly, this relates to paints containing conjugated polymers as corrosion preventive agents.

2. Prior Art

Corrosion inhibiting primers for metals such as steel are known. Corrosion inhibiting primers generally fall within two broad categories: those which provide high barrier coatings and those which impart active corrosion inhibiting properties. The high barrier coatings include various epoxies, alkyds, polyurethanes and the like. Among the latter are zinc-rich coatings which provide cathodic protection. In a middle ground are red lead and chromates which are thought to provide active protection but also function to enhance barrier properties by neutralizing acids and insolubilizing salts. These corrosion inhibiting pigments which have been, for years, the work horses of the industry, are now considered distinctly non-preferred because of their adverse toxicological properties. As a result, the industry is in search of corrosion inhibitors which perform well and are environmentally acceptable. Paints which contain conjugated backbone polymers provide such an alternative.

Various mentions have been made of the possible use of conductive conjugated polymers as corrosion inhibitors. Essentially, two different proposals have been previously made regarding the possible working mechanism for conjugated conducting polymers.

The first of these possible mechanisms falls into the category of anodic passivation of the substrate metal. This mechanism is applicable to selected metals, which include steel and aluminum, which display anodic polarization curves which have a peak in the corrosion current followed by a region of low (but non-zero) current as the potential is swept in the anodic (oxidative) direction from the rest potential (corrosion potential) of the metal in question. The region of low current is commonly referred to as the anodic passivation region. In order for the conducting polymer to function in this manner, it must be in at least a partially oxidized (p-type) state; it must be conductive (or at least semi conductive); and it must be in electrical contact with the coated metal. This idea has seen little practical application, especially in terms of a coating system designed to achieve this effect. The idea for employing conducting polymers to this end was first advanced by Colman Brian of NASA, and was pursued by A. MacDiarmid and Naseer Ahmad at the University of Pennsylvania (unpublished). Investigations to date have entailed only the use of pure conductive polymer coatings (electrochemically deposited or deposited from solution), and have provided little evidence of active corrosion protection.

The second proposed mechanism relies on the formation of a metal-semiconductor (MS) or a metal-insulator-semiconductor (MIS) junction between the base metal and a semiconductive coating. This method for corrosion protection has been demonstrated for thin coatings of wide-band-gap semiconductors (e.g., indium-doped tin oxide) which have been deposited on a metal surface. (F. L. Jain et al. "Corrosion Prevention in Metals using Layered Semiconductor/Insulator Structures Forming an Interfacial Electronic Barrier" in *Adhesives, Sealants, and Coatings for Harsh Space Environments*, Polym. Sci. and Tech., Vol. 37, PP. 381–404, (Plenum, 1988). This method relies on the formation of an electronic barrier which limits the transfer of electrons from the metal to oxidants (e.g., $O_2$) in the environment. Such a mechanism requires that the coating be semiconductive (non-degenerate) so that band bending occurs at the interface and establishes a region of depleted charge carrier concentration and an electronic barrier commonly referred to as a built-in potential. It is necessary that this semiconductive coating be applied directly to the metal (MIS junction) or on top of an insulating layer on the metal which is not thicker than about 200A (MIS junction). It has been proposed that various semiconductive polymers and organic complexes including polyacetylene and phthalocyanine might be used for this purpose (Jain et al.). The semiconductive polymer may be p-type or n-type; p-type is preferred.

All but one of the references and previous disclosures of the potential use of conjugated backbone (conductive) polymers as corrosion inhibitors refer to the use of continuous coatings of neat conductive polymers produced by solution coating techniques or by electropolymerization directly on the substrate metal. See for example, L. E. A. Berlouis and D. J. Schiffrin, "Recent Advances in Electrochemical Polymerization for Surface Coating", *Trans IMF*, Vol 64, p42 (1986) and "Anodic Synthesis of Polyaniline Coatings onto Fe Sheets", G. Mengoli, et al., *J. Appl. Polym. Sci.*, 26, 4247 (1981).

The major exception to using only the neat conductive polymer is PCT 88/00798 which is directed to an intrinsically conductive polymer that exists in the form of a dispersible solid composed of primary particles having a specific surface area according to BET of >15 $M^2/g$ and a weight average diameter when dispersed of less than 500 nm. It is disclosed that these particles are particularly useful for further processing as a dispersed phase in polymer-based paints for corrosion protection as shown in Example 18 of PCT 88/00798. The report "Conductive Organic Polymers as Corrosion Control Coatings," NASA Technical Memorandum 103811, pp. 3–5, (1990) also describes composites of conjugated polymers with epoxies.

PCT-WO 89/01694 and PCT-WO 90/10297 describe blends of polyaniline and one or more thermosetting and thermoplastic resins.

SUMMARY OF THE INVENTION

This invention relates to an improved anti-corrosion resistant paint of the type comprising one or more binders, and optionally one or more pigments or colorants, dispersed in a liquid medium, wherein said improvement comprises an anti-corrosion effective amount of one or more non-conductive conjugated polymers. As used herein, a "non-conductive conjugated polymer" is a conjugated polymer which is not doped or a doped conjugated polymer wherein the doping level is equal to or less than about 0.5 mole % based on the total number of carbon atoms and heteroatoms (nitrogen, oxygen, sulfur, selenium, phosphorus and the like) which comprise the conjugated main backbone chain or side chains of said polymers.

The paints of this invention exhibit several unique properties which make these paints suitable for protection against corrosion. For example, the materials have good adhesion and relatively low to moderate cost. Moreover, while the dispersion of the conjugated polymer in the paint may not provide a continuous coating phase of electrically conductive polymer, corrosion inhibition is surprisingly observed.

Furthermore, this corrosion inhibition is observed without the use of heavy metal additives and thus these paints are more environmentally sound than conventional anti-corrosion paints which include such additives.

DETAILED DESCRIPTION OF THE INVENTION

As an essential ingredient, the paint of this invention includes a non-conductive conjugated backbone polymer. As used herein "conjugated polymers" are homopolymers or copolymers which are comprised of alternating carbon-carbon double bonds (either singly or as part of an aromatic ring structure), and optionally heteroatoms such as oxygen, nitrogen, sulfur, selenium, phosphorous and the like along the polymer conjugated backbone or conjugated side chains thereof and can be rendered to an electrically conductive state (equal to or greater than about $10^{-8}$ S/cm as determined by the four-in-line probe method described in "Laboratory Notes on Electrical and Galvanometric Measurements" by H. H. Wieder, Elsevier Scientific Publishing Co., New York, N.Y., 1979) by doping with some dopants known in the art.

Illustrative of such polymers are poly(unsaturated) polymers such as substituted and unsubstituted polyacetylene; substituted or unsubstituted poly(heteroaromatics), such as poly(thienylenes), poly(pyrroles), poly(quinolines), poly(isothianaphthenes), poly(carbazoles), poly(alkyl thiophenes) and the like; substitited or unsubstituted poly(aromatics) such as poly(phenylene sulfides), poly(anilines), poly(phenylenes), poly(naphthalenes), poly(naphthols), and poly(perinaphthalenes); poly (benzoquinones); poly (azulenes); and substituted or unsubstituted poly(aromatic vinylenes) such as poly(phenylene vinylenes), poly(dimethoxyphenylene vinylenes), poly(naphthalene vinylenes) and the like; and substituted or unsubstituted poly(heteroaromatic vinylenes) such as poly(thienylene vinylenes), poly(furylene vinylenes), poly(carbazole vinylenes), poly(pyrrole vinylenes) and the like.

Preferred conjugated homopolymers or copolymers are "conjugated backbone homopolymers or copolymers". As used herein, "conjugated backbone homopolymers or copolymers" are conjugated homopolymers or copolymers in which all or substantially all of the conjugation is in the main backbone of the homopolymer or copolymer.

Preferred conjugated homopolymer or copolymers are substituted or unsubstituted polyanilines, poly(heterocycles), and aromatic or heteroaromatic vinylenes. Illustrative of preferred homopolymers or copolymers of poly(heterocycles), and aromatic or heteraromatic vinylenes are those described in more detail in U.S. Pat. Nos. 4,711, 742 and 5,068,060 and PCT/W088/00954. More preferred for the practice of this invention are conjugated polymers which have relatively low acidity (pka>2 preferably >4 and most preferably >6) and which are readily doped by protonic acids as for example, polyaniline, poly(benzoquinone), polypyrrole, and poly(azobenzene). Most preferred for this invention are conjugated polymers which are readily doped by protonic acids and which are oxidizing agents in their undoped state and which are capable of oxidizing the metal surface to form an impervious and/or passivating layer, as for example, the forms of polyaniline knows as emeraldine base and pernigraniline.

More preferred conjugated backbone homopolymers or copolymers are poly(anilines). As used herein, "poly(anilines)" are homopolymers or copolymers in which the recurring backbone monomeric units are selected from the group consisting of substituted or unsubstituted phenyl rings and amine linkages (—NH— or —NR— where R is a substituent other than hydrogen) which may contain varying amounts of substituted or unsubstituted quinoid rings and imine (—N=) linkages. As used herein, "neutral or undoped polyaniline" is characterized by an uncharged backbone, "polyaniline base" is a particular form of undoped polyaniline which contains at least one quinoid diimine linkage in the backbone and "electrically conductive or doped poly(aniline)" is characterized by a charged backbone which may be formed by a partial or complete protonation of the amine and/or imine nitrogen atoms.

Any form of such poly(anilines) can be conveniently used in the practice of this invention. Illustrative of useful forms are those described in Green, A. G. and Woodhead, A. E., "CXVII-Aniline-black and Allied Compounds, Part II", *J. Chem. Soc.*, 101 pp. 1117 (1912) and Kobayashi, et al., "Electrochemical Reactions . . . of Polyaniline Film-Coated Electrodes", *J. Electroanal. Chem.*, 17.7, pp. 281–91 (1984) and in Shacklette, L. W., et al. "Structure and Properties of Polyaniline as Modeled by Single-Crystal Oligomers", *J. Chem. Phys.* 88 P 3955 (1988), which are hereby incorporated by references.

In the preferred embodiments of the invention, poly(anilines) for use in the invention are homopolymers and copolymers of the type derived from the polymerization of unsubstituted and substituted anilines of the Formula I:

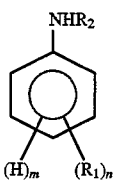

FORMULA I wherein:

n is an integer from 0 to 5;

m is an integer from 0 to 5, with the proviso that the sum of n and m is equal to 5 and with the further proviso that at least one position on the aniline ring, preferably at the para position, is substituted with a substituent which will allow coupling of the aniline units, such halo, hydrogen or other leaving group;

$R_1$ is the same or different at each occurrence and is selected from the group consisting of alkyl, deuterium, alkenyl, alkoxy, cycloalkyl, cycloalkenyl, alkanoyl, alkylthio, aryloxy, alkylthioalkyl, alkylaryl, arylalkyl, amino, alkylamino, dialkylamino, arylamino, diarylamino, alkylarylamino, aryl, alkylsulfinyl, aryloxyalkyl, alkylsulfinylalkyl, alkoxyalkyl, alkylsulfonyl, arylthio, alkylsulfonylalkyl, boric acid or salts or esters thereof, phosphoric acid or salts or esters thereof, sulfinate salts, arylsulfinyl, alkoxycarbonyl, arylsulfonyl, carboxylic acid or salts or esters thereof, phosphonic acid or salts or esters thereof, halo, hydroxy, cyano, sulfinic acid or salts or esters thereof, phosphinic acid or salts or esters thereof, sulfonic acid or salts or esters thereof, nitro, aikylsilane, or any of the foregoing aryl, aliphatic or cycloaliphatic groups substituted with one or more phosphonic acid or salts or esters thereof, sulfonic acid or salts or esters thereof, phosphoric acid or salts or esters thereof, boric acid or salts or esters thereof, sulfinic acid or salts or esters thereof, phosphinic acid or salts or esters thereof, carboxylic acid or salts or esters thereof, halo, nitro, amino, alkylamino, dialkylamino, arylamino, diarylamino, alkylarylamino, cyano or epoxy moieties; or any two $R_1$ groups together or any $R_1$ group together with any $R_2$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, or salts or esters thereof, carbonyl, sulfonyl, or oxygen atoms wherein permissible substituents are one or more phosphonic acid or salts or esters thereof, sulfonic acid or salts or esters thereof, phosphoric acid or salts or esters thereof, boric acid or salts or esters thereof, phosphinic acid or salts or esters thereof, carboxylic acid or salts or esters thereof, halo, nitro, amino, alkylamino, sulfinic acid or salts or esters thereof, dialkylamino, arylamino, diarylamino, alkylarylamino, cyano or epoxy moieties; or $R_1$ is an aliphatic moiety having repeat units of the formula:

—(OCH$_2$CH$_2$)$_q$O—CH$_3$, —(OCH$_2$CH(CH$_3$))$_q$O—CH$_3$,

—(CH$_2$)$_q$CF$_3$, —(CF$_2$)$_q$—CF$_3$ or —(CH$_2$)$_q$CH$_3$ wherein q is a positive whole number; and $R_2$ is selected from the group consisting of permissible $R_1$ substituents and hydrogen.

Illustrative of useful $R_1$ groups are hydrogen, alkyl, such as methyl, ethyl, octyl, nonyl, tert-butyl, neopentyl, isopropyl, sec-butyl, dodecyl and the like, alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoyl such as butanoyl, pentanoyl, octanoyl, ethanoyl, propanoyl and the like; amino; alkylamino, such as methylamino, ethylamino, butylamino and the like; dialkylamino, such as dimethylamino, methylethylamino and the like; arylamino such as phenylamino, p-methylphenylamino and the like; diarylamino, such as diphenylamino, p-nitrophenyl-p'-methylphenylamino and the like; alkylarylamino, such as 2-phenyl-4-methylamino and the like; alkylsulfinyl, alkylsulfonyl, alkylthio, arylthio, arylsulfinyl, and arylsulfonyl such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; cycloalkyl such as cyclohexyl, cyclopentyl, cyclo-octyl, cycloheptyl and the like; alkoxyalkyl such as methoxy-methyl, ethoxymethyl, butoxymethyl, propoxyethyl, pentoxybutyl and the like; aryloxyalkyl and aryloxyaryl such as phenoxyphenyl, phenoxymethyl and the like; and various substituted alkyl and aryl groups such as 1-hydroxybutyl, 1-aminobutyl, 1-hydroxypropyl, 1-hydroxypentyl, 1-hydroxyoctyl, 1-hydroxyethyl, 2-nitroethyl, trifluoromethyl, 3,4-epoxybutyl, cyanomethyl, 3-chloropropyl, 4-nitrophenyl, 3-cyanophenyl, and the like; acid and acid salts such as sulfonic acid, carboxylic acid and salts thereof; aliphatic or aryl groups substituted with an acid or salt thereof such as phosphonic acid, phosphinic acid, sulfonate salt, sulfinate salt, sulfonic acid, sulfinic acid, borate salt, phosphoric acid, boric acid, or carboxylic acid groups such as ethylsulfonic acid, propylsulfonic acid, 4-nitrobenzene sulfonic acid, butylsulfonic acid, phenylsulfonic acid, and the like.

Also illustrative of useful $R_1$ groups are divalent moieties derived from any two $R_1$ groups or a $R_1$ group with a $R_2$ group such as moieties having from about 2 to about 7 repeat units of the formula:

—(CR$_3$=CR$_3$)$_b$—

—(C(R$_3$)$_2$)$_a$— wherein $R_3$ is the same or different at each occurrence and is hydrogen or alkyl, as for example —(CH$_2$)$_4$—, —(CH$_2$)$_3$—, —(CH=CH—CH=CH)—, —[CH$_2$—CH(CH$_3$)—CH$_2$]— and —(CH$_2$)$_5$—, and groups comprised of such moieties which include one or more heteroatoms of oxygen, nitrogen, ester, sulfonyl, carbonyl, sulfinyl, and/or sulfur, such as —CH$_2$SCH$_2$— —CH$_2$NHCH$_2$—, —SCH$_2$NHCH$_2$—, —O—CH$_2$—CH$_2$O— —O—CH$_2$—S—CH$_2$—, —CH$_2$S(O$_2$) CH$_2$—, —CH$_2$S (0) CH$_2$—, —OC(O)CH$_2$CH$_2$—, —CH$_2$C(O) CH$_2$— and —CH$_2$—O—CH$_2$— to form heterocyclic amino compounds such as tetrahydronaphthylamine, dihydrobenzopyrroleamine, benzofuranamine, dihydrobenzopyranamine, dihydrobenzofuranamine, dihydrobenzoparaoxazineamine, dihydrobenzoparadiazineamine, dihydrobenzotriazoleamine, dihydro-benzothiazineamine, benzothiopyranamine, dihydro-benzoxazoleamine and the like. Exemplary of useful $R_3$ groups are divalent alkenylene chains containing 1 to about 3 unsaturated bonds such as divalent 1,3-butadiene and like moieties which may also include one or more divalent oxygen, nitrogen, sulfinyl, sulfonyl, carbonyl, ester, and/or sulfur groups which form such compounds as benzodiazineamine, benzodiazoleamine, benzotriazepine-amine, benzimidazolylamine, benzisoxazoleamine, benzoxazolylamine, benzothiazineamine, benzoxazineamine, naphthaleneamine, benzopyranamine, benzothiazineamine, anthraceneamine, aminobenzothiopyran, aminobenzodiazine, benzthiopyrone amine, aminocoumarin, benzthiopheneamine, benzothiodiazoleamine, and the like.

Exemplary of useful $R_2$ groups are hydrogen and the above-referenced representative $R_2$ groups described above such as alkyl as for example, methyl, ethyl, isopropyl, butyl, isobutyl, hexyl, octyl and the like; alkylsulfonyl such as methylsulfonyl, ethylsufonyl, propylsulfonyl and the like; arylsulfonyl such as phenylsulfonyl, p-methyl phenylsulfonyl, naphthylsulfonyl and the like.

Preferred polyaniline consists of repeat units of the Formulas II and/or III:

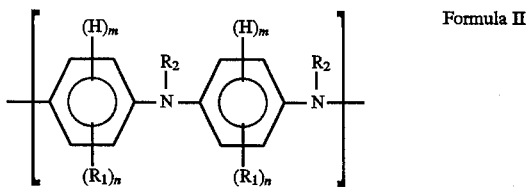

Formula II

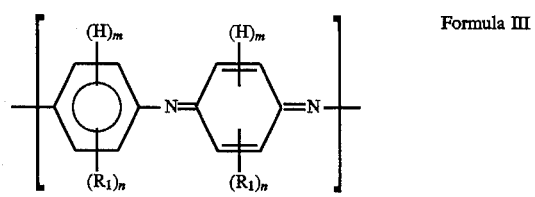

Formula III a combination thereof having various ratios of the above repeat units in the polyaniline backbone such as leucoemeraldine, protoemeraldine, emeraldine, nigraniline and pernigraniline. Poly(anilines) useful in the practice of this invention are more preferably those of the Formula IV:

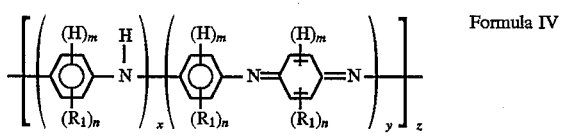

Formula IV wherein:

n, m, $R_1$ and $R_2$ are as described above;

x and y are the same or different at each occurrence and are integers equal to or greater than 0, with the proviso than the sum of x and y is greater than 0, preferably where x is an integer equal to or greater than 0 and/or that the ratio of x to y is greater than or equal to about 0, more preferably said ratio is equal to or greater than 0.5 and most preferably said ratio is equal to or greater than about 1; and z is the same or different at each occurrence and is an integer equal to or greater than about 5.

Preferred for use in the practice of this invention are poly(anilines) of the above Formula IV in which:

n is an integer from 0 or 1;

m is an integer from 3 or 4, with the proviso that the sum of n and m is equal to 4;

$R_1$ is phenyl, or alkyl or alkoxy having from 1 to about 12 carbon atoms, a protonic acid function or a salt or ester thereof, or alkyl, phenyl or alkoxy substituted with one more or protonic acids or salts or esters thereof;

x is an integer equal to or greater than 1;

y is equal to or greater than 0, with the proviso that the ratio of x to y is equal to or greater than 0.5;

z is an integer equal to or greater than about 5;

Particularly preferred for use in the practice of this invention are poly(anilines) of the above Formula IV in which:

n is an integer from 0 or 1;

m is an integer from 3 or 4 with the proviso that the sum of n and m is equal to 4;

$R_1$ is alkyl, or alkoxy having from 1 to about 6 carbon carboxylic acid or salts or esters thereof, phosphinic acid or salts or esters thereof, sulfonic acid or salts or esters thereof, sulfinic acid or salts or esters thereof, phosphonic acid or salts or esters thereof, or alkyl or alkoxy substituted with phosphinic acid or salts or esters thereof, sulfinic acid or salts or esters thereof, halo, phosphonic acid or salts or esters thereof, phosphoric acid or salts or esters thereof, or sulfonic acid or salts or esters thereof;

x is an integer equal to or greater than 2;

y is equal to or greater than 0, with the proviso that the ratio of x to y is greater than about 1; and z is an integer equal to or greater than about 10.

Amongst the preferred embodiments, more preferred for use in the practice of this invention are poly(anilines) of the above Formula IV in which:

n is an integer from 0 or 1;

m is an integer from 3 or 4, with the proviso that the sum of n and m is equal to 4;

$R_1$ is alkoxy or alkyl of from 1 to about 6 carbon atoms (preferably from 1 to about 3 carbon atoms), sulfonic acid or salts thereof, phosphoric acid or salts thereof, or phosphonic acid or salts thereof;

x is an integer equal to or greater than 2; and y is an integer equal to or greater than 1; and z is an integer equal to or greater than about 10.

In the most preferred embodiment of the invention n is 0;

m is 4;

x is an integer equal to about 2;

y is an integer equal to about 1, with the proviso that the ratio of x to y is equal to or greater than about 2; and z is an integer equal to or greater than about 10. In general, the number of conjugated homopolymer or copolymer repeat units are not critical and may vary widely. The greater the number of repeat units the greater the molecular weight of the conjugated homopolymer or copolymer and the greater the viscosity of solutions of the polymer. In the present application where conjugated homopolymers or copolymers of relatively high molecular weight and insolubility are required, then such materials can be used. The number of repeat units (z) is preferably at least about 10. The upper limit can vary widely depending on the desired molecular weight and viscosity and the required degree of processibility, such as melt processibility, solution processibility and the like. In the preferred embodiments of the invention, the number of repeat units is at least about 20, and in the particularly preferred embodiments, the number of repeat units is at least about 30. Amongst the particularly preferred embodiments, most preferred are those embodiments in which the number of repeat units is at least about 40.

In the most preferred embodiments the molecular weight will be sufficiently high to render the conjugated polymer insoluble in the solvent or solvent mixture of the particular paint formulation such that the conjugated polymer will form a dispersion of small particles in the solvent or solvent mixture.

Conjugated homopolymers and copolymers can be conveniently prepared through conventional procedures. Such procedures are well known in the art and will not be described herein in great detail. See for example U.S. Pat. Nos. 4,940,640; 4,711,742; 4,521,589; 4,808,681; 4,983,322; 5,006,278 and 4,900,782; PCT WO88/00954; and "The Handbood of Conducting Polymers", edited by Terje A. Skotheim, Marcell Decker, Inc., New York and Basel and references cited therein, all of which is hereby incorporated by reference. For example, preferred polyanilines can be prepared through use of chemical and electrochemical synthetic procedures. For example, one form of polyaniline can be prepared by treating aniline with ammonium persulfate $(NH_4)_2S_2O_8$ in excess 1M HCl. This powdered form of polyaniline is blue green in color. After methanol washing and air drying this material exhibits a conductivity of about 5 S/cm. This conductive form of polyaniline can be treated with ammonium hydroxide in ethanol to form a non-conductive form of polyaniline which is dark blue in color and which has a conductivity of less than $10^{-8}$ S/cm. Other chemical procedures for preparation of various chemical forms of polyaniline are described in detail in Green et al and U.S. Pat. Nos. 4,855,361, 4,798,685, 4,806,271, 4,822,638, 4,851,487 and 4,940,517 described above.

Useful forms of polyaniline can also be prepared electrochemically. For example, useful forms of polyaniline can be prepared by the electrochemical oxidation of aniline in aqueous fluoroboric acid electrolyte on a platinum foil anode.

Other chemical and electrochemical syntheses and transformations of the conductive form of polyaniline may be discovered and are presently contemplated as being useful. Moreover, additional forms or types of polyaniline may be elucidated in the future. Accordingly, no limitation to the syntheses, transformation, or structures herein described or postulated is intended beyond the limitations of the appended claims.

The conjugated homopolymer or copolymer for use in the practice of this invention may be undoped or may be doped with a suitable dopant, provided that the electrical conductivity is less than about $10^{-8}$ ohm$^{-1}$ cm$^{-1}$ by the four-in-line probe method and the doping level is less than about 0.5 mole % based on the total number of carbon atoms and heteroatoms which participate in the conjugation. Dopants for use in the practice of this invention can vary widely and can be such materials which are known in the art for use in doping conjugated homopolymers or polymers to form conductive or semi-conductive polymers, as for example, those described in detail in U.S. Pat. Nos. 4,442,187 and 4,321,114, and PCT WO 90/10297 and PCT WO 89/1694, which are hereby incorporated by reference. Illustrative of useful dopant species are oxidizing dopants such as $AsF_5$, $MoOCl_4$, $MoCl_5$, $PC_5$, $POCl_3$, $PCl_3$, $AlCl_3$, $NO^+$ and $NO_2^+$ salts (such as $NOBF_4$, $NOPF_6$, $NOSbF_6$, $NOAsF_6$, $NOCH_3CO_2$, $NO_2BF_4$, $NO_2PF_6$, $NO_2AsF_6$, $NO_2SbF_6$, and $NO_2(CF_3SO_2)$, $HClO_4$, $HNO_3$, $H_2SO_4$, benzoylperoxide, $SO_3$, $Br_2$, $(FSO_3)_2$, $ZnCl_2$, $FSO_3H$, and Fe(III) salts (such as $Fe(BF_4)_3$, $FeBr_3$, $Fe(CH_3SO_3)_3$, $Fe(ClO_4)_3$, $FeCl_3$, $Fe(OTs)_3$, and $Fe(CF_3SO_3)_3$ which give rise to doped polymers containing dopant ions such as $NO_3-$, $CH_3SO_3^-$, $AlCl_4^-$, $BF_4^-$, $ZnCl_4^-$, $PCl_4^-$, $PF_6^-$, $AsF_6^-$, $SbF_6^-$, $CF_3SO_3^-$, $ClO_4^-$, $OTs^-$, $SO_3^{-2}$, $C_6H_5CO_2^-$, $CH_3SO_3^-$, $FSO_3^-$, and $FeCl_4^-$, and Cu(II) salts such as $CuCl_2$ which may give dopant anions such as $Cl^-$ or $CuCl_3^-$.

Illustrative of other dopants are protonic acid dopants. Such dopants include inorganic acids, such as hydrofluoric acid, hydriodic acid, inorganic phosphorus acids such as phosphoric acid and the like, nitric acid, boric acid, inorganic sulfur acids such as sulfuric acid and the like. Such dopants also include organic acids such as 1-anthracene sulfonic acid, oxalic acid, 9-anthracene sulfonic acid, tartaric acid, 2-phenanthrene sulfonic acid, malonic acid, 3-phenanthrene sulfonic acid, succinic acid, 9-phenanthrene sulfonic acid, glutaric acid, adipic acid, trifluoromethane sulfonic acid, pimelic acid, perflourooctyl sulfonic acid, azelaic acid, perfluorooctyl carboxylic acid, sebacic acid, octyl sulfonic acid, phthalic acid, dodecyl sulfonic acid, isophthalic, cetyl sulfonic acid, terephthalic, toluene sulfonic acid, methyl phosphinic acid, dimethyl phosphinic acid, phenyl phosphonic acid, dodecylbenzene sulfonic acid, naphthalene sulfonic acid, benzene disulfonic acid, benzene sulfonic acid, 1,3-benzene disulfonic acid, 2,5-dihydroxy-1,4-benzene disulfonic acid, camphor sulfinic acid, naphthalene trisulfonic acid, ethylbenzene sulfonic acid, ethane sulfonic acid 1,5-naphthalene disulfonic acid, nickel phthalocyanine tetrasulfonic acid, phenyl phosphonic acid, diphenyl phosphinic acid, phenyl phosphinic acid, ortho boric acid, 3-sulfopropyl acrylate, meta boric acid, 3-sulfopropyl methacrylate, sulfamic acid, 5-sulfosalicyclic acid, trion (4,5-dihydroxy-, 3-benzene disulfonic acid), vinyl sulfonic acid, arsenic acid, arsenous acid, arsinic acid, arsonic acid, sulfanilic acid, 4-sulfophthalic acid, sulfoacetic acid, methyl phosphinic acid, phenylphosphonic acid, methyl phosphonic acid, methyl orange, sulfonated polystyrene, hydroboxofluoric acid, orthophosphoric acid, pyroboric acid, sulfonated poly(2-vinyl naphthalene), naphthol yellow, naphthol blue black, 1,2-naphthoquinone-4-sulfonic acid, naphthylazoxine S, 1-octane sulfonic acid, pyrophosphoric acid, metaphosphoric acid, orthophosphorous acid, t-butyl phosphonic acid, ethyl phosphonic acid, butyl phosphonic acid, 1,2-benzene disulfonic acid, 4-octylbenzene sulfonic acid, 2-mesitylene sulfonic acid, 2,6-naphthalene disulfonic acid, 2-naphthalene sulfonic acid, 1,3,6-naphthalene trisulfonic acid, 1,3,7-naphthalene trisulfonic acid, sulfonazo III acid, biphenyl disulfonic acid, biphenyl sulfonic acid, 1,8-dihydroxynaphthalene-3-6-disulfonic acid, 3,6-dihydroxynaphthalene-2,7-disulfonic acid, 4,5-dihydroxynaphthalene-2,7-disulfonic acid, 6,7-dihydroxy-2-naphthalene sulfonic acid, 1-naphthalene phosphoric acid, 1-naphthalene sulfonic acid, 1-naphthalene-5,7-dinitro-8-hydroxy, 1-naphthalene-4-hydroxy sulfonic acid, 4-bromo benzene sulfonic acid, 4-hydroxy-5-isopropyl-2-methyl benzene sulfonic acid, 3,4-diamino benzene sulfonic acid benzenephosphoric acid, 1,3,5-benzene trisulfonic acid, 2-methyl-5-isopropyl benzene sulfonic acid, 3,4-dinitro benzene sulfonic acid, 2-methoxy benzene sulfonic acid, 1-naphthalene-5-hydroxy sulfonic acid, 1-naphthalene-7-hydroxy sulfonic acid, 1-naphthalene-3-hydroxy sulfonic acid, 2-napthalene-1-hydroxy sulfonic acid, 4-phenylamino benzene sulfonic acid, 2,6-naphthalene disulfonic acid, 1,5-naphthalene disulfonic acid, dinonylnaphthalene sulfonic acid, phenylboronic acid, 1,2-benzene boronic acid sulfonic acid, and 1,3-naphthalene-7-hydroxy disulfonic acid.

In the preferred embodiments of the invention the conjugated polymer is not doped.

The amount of non-conductive conjugated polymer included in the paint composition may vary widely, and any amount which improved the anti-corrosive properties to any extent may be used. The amount of non-conductive conjugated polymer employed in preferably at least about 2% by weight, more preferably at least about 6% by weight of the dried film formed from the pain containing the non-conductive conjugated polymer.

As other essential ingredients, the paint of this invention comprises a binder, and a dispersion liquid. Any conventional binder, and dispersion liquid can be used provided that they provide the paint system with desirable coating properties and having an electrical conductivity of less than about $10^{-8}$ S/cm.

Any conventional binder which provides this effect can be used. Illustrative of useful binders are those which contain drying oils which react on curing to form a solid polymer. Drying oils include unsaturated compounds such as linseed oil, safflower oil, soya oil, talc oil, cottonseed oil, tung oil and oiticica which usually contain fairly large percentages of unsaturated acids such as oleic, linoleic, linolenic, eleostearic and licanic acids. These unsaturated oils react with oxygen in the air to form solid polymer. Other useful binding agents are materials such as isocyanates, which react with water vapor to polymerize.

Illustrative of other useful binders are thermoset polymers and thermoplastic polymers. Thermoset polymers for use are binders in the practice of this invention may vary widely. Illustrative of such useful thermoset polymers are alkyds derived from the esterification of a polybasic acid such as phthalic acid and a polyhydric alcohol such as glycol; allylics such as those produced by polymerization of dialkyl phthalate, dialkyl isophthalate, dialkyl maleate, and dialkyl chlorendate; amino resins such as those produced by addition reaction between formaldehyde and such compounds as melamine, urea, aniline, ethylene urea, sulfonamide and dicyandiamide; epoxies such as epoxy phenol novolak resins, diglycidyl ethers of hisphenol A and cycloaliphatic epoxies; phenolics such as resins derived from reaction of substituted and unsubstituted phenols such as cresol and phenol with an aldehyde such as formaldehyde and acetaldehyde; polyesters; silicones; and urethanes formed by reaction of a polyisocyanate such as 2,6-tolylene diisocyanate, 2,4-tolylene diisocyanate, 4,4-diphenylmethane diisocyanate, 1,6-hexamethylene diisocyanate and 4,4'-dicyclohexylmethane diisocyanate with a polyol such as polyether polyol (trimethylol propane, 1,2, 6-hexanetriol, 2-methyl glycoside, pentaerythitol, poly(1,4-tetramethylene ether) glycol, sorbitol and sucrose), polyester polyols such as those prepared by esterification of adipic acid, phthalic acid and like carboxylic acids with an excess of difunctional alcohols such as ethylene glycol, diethylene glycol, propanediols and butanediols.

Preferred thermosetting resin binders are alkyds, epoxies, unsaturated polyesters, thermosetting acrylics, phenolics, polyurethanes and coumarene indene. Preferred alkyds are polyester resins made from polybasic acids and polyhydric alcohols. Glycerol and pentaerythrital may be used for the polycarboxylic acids. All of the oils described above can be used in alkyds by converting the fatty acid oils to monoglycerides and then reacting with a dibasic acid such as phthalic anhydride. Alkyd resins vary greatly in their properties because of the many different oils, alcohols, and acids that can be used to make them. Alkyds have faster drying, better gloss retention, and better color than oils. Most unmodified alkyds have low chemical and alkali resistance. Alkyds can be modified with rosin esterified in place of some oil acids. Phenolic resins, such as o- or p-phenylphenol, can also be used in order to produce greater hardness and better chemical resistance. Styrene and vinyl toluene may also be used to modify alkyds for faster dry, better hardness, and toughness. Silicones may be added to alkyds to provide paints having good adhesion, hardness, flexibility, toughness, exterior durability, and resistance to solvents, acids, and alkalis. Acrylic monomers can be copolymerized with oils to modify alkyd resins for fast dry, good initial gloss, adhesion, and exterior durability. Aromatic acids, e.g., benzoic or butylbenzoic, may be used to replace part of the fatty acids for faster air dry, high gloss, hardness, chemical resistance, and adhesion.

Preferred epoxy resins are prepared from epichlorohydrin and a dihydroxy compound, usually a biphenol. Two reactions are involved in the polymerization: condensation to eliminate HCl and addition reactions to open epoxide rings along the chain to produce hydroxyl groups. The polymer has epoxide rings at each end and hydroxyl groups along the chain, which ensure good adhesion to polar surfaces such as metals. There are two types of epoxy resins, catalyzed types and epoxy esters. Catalyzed epoxies must be converted to useful products by reaction with curing agents, e.g., amines, polyamide resins, polysulfide resins, anhydrides, metallic hydroxides, or Lewis acids. These agents are not a component of the paint. Most of these materials are supplied as two-package systems to separate the materials until just before application. Polymer curing takes place by reaction of a curing agent with epoxide rings to cross-link the polymer. Paints made from these polymers have excellent chemical resistance and hardness and are often used for maintenance coatings, trade sales specialties, and industrial finishes. Chalking with exterior exposure and the two-package system limit the use of epoxy finishes. The epoxy resin can also be reacted with drying oils or fatty acids to produce epoxy esters, which cure by air drying or heat. Paints made with epoxy esters do not have as good chemical and solvent resistance as catalyzed epoxies, but they are superior to oils and alkyds in this respect. They also exhibit chalking on exterior exposure.

Preferred thermosetting acrylic resins have at least one monomer belonging to the acrylic family which will react with itself or other resins at elevated temperatures to cross-link in order to cure. In addition to the acrylic monomers previously listed, acrylonitrile, acrylamide, styrene, and vinyl toluene are often used in these polymers. Polymers which react to crosslink primarily because of hydroxyl groups are usually combined with an epoxy resin; those which react mainly with carboxyl groups usually are combined with an amine resin. Thermosetting acrylic paints, which are hard and stain-resistant and have high gloss, are often used for appliance finishes. Tough flexible finishes can be formulated for coil coatings.

Preferred polyesters are unsaturated thermosetting polyester resins similar to those used for reinforced plastic. Although alkyds can be considered unsaturated polyesters, this term has been reserved for resins which have unsaturated compounds in the backbone of the polymer. These resins are made by reacting unsaturated dibasic acids, e.g. maleic anhydride, citraconic anhydride, fumaric acid, itaconic acid, phthalic anhydride, and adipic acid, with polyhydric alcohols, e.g., propylene glycol. Styrene or some other aromatic vinyl monomer is added to the polyester resin, which is then solubilized and made into a paint. Inhibitors, e.g., hydroquinone, may be added to prevent premature polymerization in the can; organic peroxides or some other catalyst must be added to initiate polymerization of the styrene monomer and the polyester resin for curing, which is often carried out at elevated temperatures. Polyester finishes are very hard, tough, resistant to solvents, and fairly heat-resistant. Silicones may be added to modify polyester for better exterior durability.

Preferred phenolic resins as used in coatings are primarily made from phenol and para-substituted phenols reacted with formaldehyde to form methylol groups on the phenol ring. Condensation polymers are often produced by reacting these groups with phenol. Phenolic coatings have fast dry, high build, and good resistance to moisture and chemicals. Their poor initial color and tendency to yellow after application limit their use. Phenolic coatings may be used for baked can coatings, and oil-modified phenolaldehyde finishes may be used for marine finishes and aluminum paints.

Polyurethanes are based upon reactions of isocyanates, RNCO where R is an organic radical. Urethane coatings have excellent solvent and chemical resistance, abrasion resistance, hardness, flexibility, gloss, and electrical properties. They are, however, rather expensive, and the aromatic isocyanates yellow after application. Polyisocyanates such as toluene diisocyanate react with hydroxylated drying oils to produce resins analogous to alkyds and epoxy esters. Finishes made with these urethane oils air-dry by oxidation of the unsaturated oils. Polyhydroxy materials can be reacted with isocyanates with an excess of the isocyanate so that the polymer will contain NCO groups, which react with moisture in the air after the coating is applied to crosslink the polymer for curing. Moisture-cured urethanes are difficult to pigment since the pigments must be completely dry and nonalkaline. They are used primarily for clear coatings. Phenols will react with an isocyanate to block the isocyanate or prevent it from reacting with hydroxylated materials in the system. When this type of coating is heated to 150° C. after application, the phenol volatilizes from the film, leaving the isocyanate free to react with the hydroxyl-bearing resin to cure the film. Where a calalyst is employed, two-package systems are also used where a catalyst, e.g., a tertiary amine, is added to cross-link the polymer.

Coumarin-indene resins which are derived from coal tar are used widely to make aluminum paints since they aid leafing of the aluminum and minimize gas formation. They have a yellow color, however, and only fair durability except in aluminum paints.

Urea-formaldehyde, melamine-formaldehyde, and other triazine-formaldehyde resins are all hard, glossy, colorless, brittle, and chemically resistant thermosetting polymers used to modify basic coating vehicles, such as alkyds, thermosetting acrylics, and vinyls. Rosin may be used in making vehicles, such as maleic rosin alkyds, for use in consumer products or industrial finishes. Silicones may be used to modify alkyds and polyesters for better exterior durability.

Illustrative of still other polymers which are useful as binders are thermoplastic resins, such as polyesters, polyamides, polycarbonates, polymers derived from the polymerization of α,β-unsaturated monomers and the like. Preferred thermoplastic binders are vinyl polymers and copolymers such as vinyl chloride/vinyl acetate copolymers and the like; cellulosic polymers such as nitrocellulose, ethyl cellulose, ethyl hydroxyethyl cellulose, cellulose acetate, hydroxy ethyl cellulose and the like; rubbers such as styrene-butadiene copolymer, chlorinated natural rubbers, and the like; and acrylic polymers or copolymers such as those derived from methyl methacrylate, butyl methyacrylate, methyl acrylates, butyl acrylate, ethyl acrylate, 2-ethylhexyl acrylate and the like.

The liquid dispersion medium used in the practice of this invention may vary widely and any such medium used in conventional paints may be used. Such mediums and the particular binders with which they are used are well known in the art and will not be described in detail. Illustrative of such dispersion mediums are water and organic liquids such as hydrocarbons. Paints are often classified on the bases of the dispersion medium; those which use water as the primary liquid of the paint and those which use organic liquids as the primary liquid of the paint. Many of the same polymeric binders can be used in both types of paint.

Water based paints are primarily latex paints, where the polymer particles are a discontinuous phase and water is the continuous phase. The water used to support the latex particles may be basic or acidic. Acidic formulations are preferred for the current invention. More preferably, the pH is equal to or less than about 5. Most preferably the pH is equal to or less than 3. In latex paints, the latex binder consists of very small particles of liquid to semisolid polymer separated by water, which is the continuous phase. When the water evaporates, the polymer particles touch each other and fuse together, or coalesce, into a continuous paint film on drying. When used, pigment particles are also dispersed in the water phase, and the dry paint film consists of a mixture of pigment and polymer particles fused together. If the latex particles are so hard that they will not fuse together when the water evaporates, plasticizers are preferably added, e.g. carbitol acetate or dibutyl phthalate. Rutile titanium dioxide is the primary pigment used in latex paints to obtain opacity, or hiding, in white or pastel paints. Semi-chalking grades are used for interior paints, chalk-resistant grades for exterior paints, and fine-particle-size grades for semigloss paints. Zinc oxide is sometimes used for exterior paints to help prevent mildew, but care must be taken in using this pigment because of its chemical reactivity.

A number of pigments, such as calcined clay and delaminated clay, can be used to advantage in latex paints as titanium dioxide extenders to increase opacity. These pigments have large surfaces areas due to irregular surfaces or fine particle size, and the latex vehicle will not cover all the pigment surface when the paint film is dry, leaving entrapped air in the film. The interfaces of air with pigment and vehicle increase the light scattering within the film and thus the opacity. Good hiding can be obtained with these pigments at a low cost, but the paint film often becomes porous and difficult to clean and is less preferred for the anticorrosion application of the present invention.

Most of the common extenders, e.g., mica, calcium carbonate, clay, talc, silica, and wollastonite, can be used in latex paints. Since these pigments vary in particle size, shape, hardness, color, surface treatment, and water demand, they can affect viscosity, flow, gloss, color, cleanability, scrubbability, enamel holdout, uniformity of appearance, and even opacity to some extent. Extender pigments are selected to obtain the desired properties for each type of paint. Slightly soluble ammonium phosphate compounds are used as the primary pigment in intumescent fire-retardant paints.

Surfactants are used in latex paints to help wet and disperse pigments, emulsify liquids, and function as defoamers. These materials have a balanced polar-nonpolar structure, which in water-base paints is usually referred to as a hydrophile-lipophile balance. The chemical composition of surfactants can vary greatly, and they are usually only classified into anionic, cationic, and nonionic types. Anionic surfactnats (arylalkylsulfonates, sulfosuccinic acid esters, soaps, water-soluble amines, and sulfonated oils) and non-ionic surfactants (partial esters of polyhydric alcohols with long-chain carboxylic acids, long-chain alcohols with free hydroxyl groups, and ethers of poly-hydric alcohols with long-chain fatty alcohols) are used primarily in latex paints.

The more hydrophilic water-soluble surfactants are used to wet and disperse pigments. Surfactants with a lipophilic chain to dissolve in a polar liquid and a hydrophilic group to dissolve in water are used to emulsify varnishes or oils in latex paints. Surfactants which are not water-soluble are used as defoamers.

Thickeners or protective colloids are used in latex paints to produce the desired viscosity and help stabilize emulsions and pigment dispersions. Water-soluble protein or casein dispersions and cellulosic polymers (carboxymethyl, hydroxyethyl, and methyl cellulose) are the most commonly used. Soluble polyacrylates, starches, natural gums, and inorganic colloidal materials have also been used.

Protective colloids can affect many properties of a paint, such as washability, brushability, rheological properties, and color acceptance. Since latex paints are susceptible to bacterial attack, they should contain preservatives. Several different types of perservatives can be used: phenolic, mercuric, arsenic, or copper compounds, formaldehyde, and certain quaternary chlorinated compounds. Some of these compounds are chemically active, and some are toxic, facts which must be considered in selecting a preservative. Many of the polymers used in the plastics industry and in solution coatings previously described can also be obtained in latex form. An advantage of using polymers in this form is that high-molecular-weight fully cured polymers can be made to flow well whereas in solution form they would have high solution viscosities. The main types of latex polymers used in latex paints are styrene-butadiene, vinyl homo- or copolymers, and acrylic polymers or copolymers.

In the preferred embodiments of the invention, the dispersion medium is an organic liquid, because unmodified thermosetting polymeric binders such as alkyds can be dissolved in such liquids. However, in other embodiments many of the synthetic polymers now used in solvent or latex paints can be solubilized in water. Carboxylic, hydroxyl, epoxy, or amine groups on a polymer in conjunction with coupling solvents, such as alcohols, alcohol ethers, or glycol ethers, are the primary mechanisms by which resins are solubilized. Maleic or fumaric acids can be reacted with drying oils to produce resins with some carboxyl groups which can be solubilized in water with ammonia or amines. Alkyds can be solubilized in water by leaving a reactive carboxylic group on the resin instead of terminating the reaction with a monobasic acid or drying-oil acid. Dimethylol propionic acid, $CH_3C(CH_2OH)_2 COOH$, and trimellitic anhydride have been used for this reaction. A styrene-alkyl alcohol copolymer esterified by a fatty acid and reacted with maleic anhydride to provide solubility can be used as a water-soluble paint vehicle. Amine-solubilized water soluble polyesters, acrylics, epoxy esters, and phenolics can also be prepared. Water-soluble resins are usually solubilized by volatile alkalis, such as amines, to prevent the paint resin from remaining water-soluble after application.

As a preferred optional ingredient, the paint of this invention includes a colorant or pigment. Since conjugated backbone polymers are most often colored, they may provide a color function. In other instances, additional pigments or colorants may be required. Such materials are well known in the art and will not be described in any great detail. Illustrative of useful pigments are metal oxides, such as titanium oxide, zinc oxide, lead oxide, iron oxide and the like; and metal sulfides such as zinc sulfide, cadmium sulfide and the like.

In addition to the pigment, binder, and liquid, a paint also may contain many optional additives, such as defoamers, extenders, thickeners, flow agents, drying agents catalysts, preservatives, wetting agents, barrier enhancers such as clay and mica, and surfactants, viscosity modifiers and plasticizers to improve various properties of the paint. These optional additives are well known in the art and will not be described herein in any great detail. The selection of the pigments, binder, and additives depends, of course, upon the properties desired in the paint to be made.

The paint of this invention can be conveniently manufactured using conventional procedures well known to those of skill in the art. Illustrative of such procedures are those described in detail in U.S. Pat. Nos. 4,403,866, 2,923,438, 3,601,589, and 3,916,168; and British Pat. No. 1,589,705.

A primary concern in the manufacture of paint is the dispersion of pigments in the liquid portion of the paint. The paints of this invention may optionally contain pigments to act as colorants, extenders, diffusion barriers and the like, in addition to the conjugated polymers of this invention. Since the conjugated polymers of this invention are present as a fine particle dispersion, a similar art may be employed to achieve the requisite dispersion of the conjugated polymer and the optional pigment alike. Pigments used in paint contain aggregates of fine particles, which are held together by strong forces of attraction. Work is required in the form of high shear or attrition applied to the pigment liquid slurry in order to reduce the pigments to their ultimate particle size as determined by the manufacturer of the pigment. Considerable work may also be required to wet the surface of the pigment and to displace any air or moisture that may be absorbed on the surface by the liquid. Wetting agents such as soaps or detergents in the water phase of latex paints are often used to help wet and disperse pigments.

After the pigments are dispersed, they must be prevented from coming together again and flocculating, or forming soft lumps of pigment and liquid. The nonpolar binder of a solvent-thinned paint will usually serve to envelope the pigment particles and prevent the electrostatic charges on the surface of the pigments from causing flocculation. In dispersions of water-based paints surfactants in the water phase will neutralize the charges on the pigment surfaces, and protective colloids, such as water-soluble cellulosic polymers, are introduced into the water phase to prevent flocculation after dispersion. In practice, few pigments are dispersed to their ultimate particle size, and paints usually contain many aggregates and flocculants.

Since some pigments are harder to disperse than others, different types of dispersing equipment or mills are used. Dispersing pigments in a liquid is often called grinding although there is very little reduction in size of the original pigment particles during the dispersion operation of paint manufacture.

The high-speed stone mill consists of a stationary carborundum stone and high-speed rotating stone. Pigment pastes are passed between these stones; the distance between the stones can be varied for more or less shearing action. These mills are suitable for high production rates of paints fairly easy to disperse, e.g., architectural paints, where very fine dispersion is not required.

Roller mills consist of steel rollers rotating in opposite directions at different speeds. The pigment-liquid paste is passed between the rolls, which can be adjusted to different clearances. Three-roll mills are the most widely used in the paint industry. Roller mills have relatively slow production rates and require skilled operators but are capable of producing fine dispersion.

Heavy-duty dough mixers, consisting of two roughly S-shaped blades which overlap and rotate in opposite directions, are sometimes used to disperse very heavy pastes.

Ball and pebble mills consist of large cylindrical steel tanks which rotate around a horizontal axis. The mill is partly filled with steel or porcelain balls or pebbles and the material to be dispersed. Baffle bars are usually added to the sides of the tank to help lift the balls for better dispersion. Steel balls are more efficient because of their greater density but cannot be used to produce white paints. Ball mills require little attention after they have been charged and are capable of producing good dispersion.

The sand mill consists of a cylinder containing coarse sand as a grinding medium. The pigment paste to be dispersed is fed into the mill, and rotating impeller disks driven by a vertical shaft impart a circulation pattern to the sand-paste mixture. The difference is velocity between the particles near the surface of the impellers and the rest of the material develops a high shear action to disperse the pigments. A coarse screen allows the pigment slurry to pass through the mill while retaining the sand in the mill. Pigment slurrys can be passed through these mills for continuous operation. Production rates of sand mills can be fairly good, and dispersion is quite good. These mills are often used for high-quality industrial finishes.

The high-speed disperser consists of a tank containing a circular impeller driven at high speed by a vertical shaft. Dispersion of the pigment liquid mixture is achieved by high shear action developed near the surface of the impeller. High-speed dispersers are used where very fine dispersion is not required or whenever the pigments will disperse easily in the liquid. The production rate is very high, and this type of equipment is used to manufacture most architectural paints.

The necessary preparation time for the paint can be lessened by making a pre-dispersion or concentrate which may consist of the conjugated polymer dispersed in a liquid medium or in a resin optionally containing an additional pigment. The concentration of said conjugated polymer in said dispersion medium is preferably greater than two times the desired concentration in the paint and more preferrably greater than three times such concentration. The preparation methods for said concentrate may be similar to that described herein for the dispersion of pigments when the medium is a liquid. When the medium is a thermoplastic resin, a precured thermosetting resin or a combination thereof, methods known in the art for compounding fillers in such resins may be employed.

The particle size of the conductive polymer in the dispersion of this invention is critical and the size should be such that the polymer can be dispersed in the paint or concentrate to the desired extent. Whether by grinding, milling, shearing, or dispersing, the particle size of the conductive polymer should preferably be less than about Hegman 5, more preferably less than about Hegman 6, and most preferably less than about Hegman 7.

After the conjugated polymer and the optional pigments are dispersed and stabilized in the liquid or concentrate, said liquid or concentrate is usually transferred to a thin-down tank, equipped with slower agitation, where the paint is adjusted to the desired viscosity and shaded. Materials can be added to the paint in the thin-down tank that are not required in the grinding operation and can be added with slow agitation. The binder of a solvent-thinned paint is usually added during the grinding operation; the binder of a latex paint is usually added in the thin-down tank. Thin-down tanks are usually on a floor below the grinding equipment to take advantage of gravity flow, and the finished paint is usually dropped to a floor below the thin-down tanks for straining and filling.

The paints of this invention are useful for such purposes for which conventional paints are used. For example, these paints are useful as top coats, fillers, primers, surfacers and sealers. Paints used as the final coat on a surface are referred to as finish coats or topcoats. Paint applied before the topcoat is called an undercoat. Undercoats often are classified according to use. Fillers are undercoats used to fill holes, pores, or irregularities to provide a uniform surface for the topcoat. Primers are used to aid the adhesion of the topcoat to a surface and to prevent absorption of the topcoat into a porous surface. Primers can also be used to prevent corrosion of metals that are to be painted. Surfacers are highly pigmented undercoaters used to make a surface more uniform and give adhesion to the final coat. Surfacers often are formulated so that they can be sanded smooth before the topcoat is applied. Sealers are clear or pigmented materials applied to a surface to prevent some materials in the surface to be painted, e.g., a dye, from migrating into the topcoat.

The paints of this invention exhibit anti corrosive properties. These paints when applied to a metal substrate prevent or retard corrosion of the metal. The anti corrosive properties of the paint of this invention result form the conjugated backbone copolymer or copolymer component of the paint. The paints of this invention are preferably used in applications where anti corrosive properties are useful.

The paints of this invention are preferably used as primers for coating metals which may be subject to corrosion such as steel, steel alloys, aluminum, aluminum alloys and other non-noble metals. The paints are preferably applied to bare "white" metal, which has been prepared by cleaning, sanding, scraping, sand blasting or other methods known in the art for forming a bare white surface.

The paint may be applied to form coatings using conventional procedure. For example, paints may be applied by brush and rollers, air or airless spray equipment, electrostatic, hot, or steam spraying; use of aerosol packaging; dip, flow, and electrodeposition coating; roller coating machines; and powder coating.

Although most architectural paints are applied with a brush or roller, much paint is now being applied by professional painters with compressed air or airless spray equipment. With airless spray equipment the paint is atomized by forcing it through a very small orifice under very high pressure.

With electrostatic spraying the atomized paint is attracted to the conductive object to be painted by an electrostatic potential between the paint and the object. Very little paint is lost with this process, and irregular objects can be coated uniformly.

Hot spray application consists of heating the paint so that it is more fluid and higher-solids paints can be applied. With steam spraying, steam is used to atomize the paint.

Two-component spray equipment consists of two material lines leading to the spray gun so that two materials, e.g., an epoxy and a catalyst, can be mixed in the gun just before application.

Aerosol is a method of packaging paint in a can containing a compressed gas so that the paint can be atomized through a small orifice opened by a push button.

Many different methods are used for industrial application of paint, including most of the spray methods.

Dip application is a simple method where objects to be coated are suspended from a conveyor chain and dipped into a large tank containing the paint. This method is often used for undercoating objects where paint uniformity and appearance are not important.

In flow coating the paint is allowed to flow over the object to be painted, which is usually suspended from a conveyor. This process is similar to dip coating but is used where the object, e.g., a bed spring, is too large for a tank.

Electrodeposition consists of depositing a paint on a conductive surface from a water bath containing the paint. The negatively charged paint particles are attracted to the object to be coated, which is the anode when an electric potential is applied. Paint can be applied to very irregular surfaces at very uniform thickness with little loss of paint. The system is normally limited to one coat of limited film thickness, and equipment cost is high, but the conductive paints of this invention may be applied as multiple coats since the substrates remain conductive.

Roller coating machines are used to apply paint to one or both sides of flat surfaces, e.g., fiberboard or tin plate. The thickness of the coating can be controlled by the clearance between a doctor blade and the applicator rolls. Decorative effects, such as wood-grain pattern, can be applied with these machines. Flat sheets of wood, fiberboard, or metal and rolls of fabric, paper, or metal can be coated with these machines.

In powder coating paint, a dry powder form is applied on the surface of a heated or electrostatically grounded object to be coated. Following powder application, the object is heated to fuse and cure the coating.

The following examples are presented to more particularly illustrate the invention and are not to be construed as limitations thereon.

EXAMPLES 1 and 2 and COMPARATIVE EXAMPLE 1

Alkyd based paints containing various amounts and forms of poly(aniline) were formulated to a specification which was similar to that given for Alkyd Primer #25 by the Steel Structures Painting Council (SSPC). The paints prepared contained no corrosion preventive additives except for poly (aniline). Formulations differed from paint #25 in that they contained no lead oxide and no iron oxide. Rather, they contained a mixture of titanium dioxide as the pigment and poly(aniline) as the conjugated backbone polymer. After the initial synthesis of poly(aniline) tosylate the poly(aniline) was treated with an aqueous wash of pH 1 containing dodecylbenzene sulfonic acid resulting in an electrically conductive poly(aniline). Paint containing non-conductive (less than 2% tosylate per phenyl-nitrogen repeat unit) poly(aniline)) was formulated by treating the electrically conductive polyaniline component at pH-1 with ammonium hydroxide until pH 11 was reached to form non-conductive polyaniline. For comparison purposes, partially doped (30% tosylate per repeat unit) poly(aniline) was formulated by treating the electrically conductive. Non-conductive by treating conductive poly(aniline) with sodium carbonate until a pH 4 was reached to form partially doped poly (anilines). After drying, these poly(anilines) were added to a liquid dispersion medium along with other paint ingredients, to form a concentrate or tint base as illustrated in the following Table 1 for the case of pH 11-polyaniline.

TABLE 1

FORMULATION FOR CONCENTRATE OF PANI 11

| | MATERIALS | AMOUNT | VOLUME PERCENT |
|---|---|---|---|
| | I. Charge the Following to the pebble mill: | | |
| a) | PANI[1] | 32.70 kg | 7.01 |
| b) | DA 15[2] | 62.35 kg | 16.55 |
| c) | PMA[3] | 94.39 kg | 25.83 |
| d) | Aromatic Naphtha 100 | 94.39 kg | 28.64 |
| | II. Grind for over 50 hours of Hegman 7+, then let down as follows; | | |
| a) | PMA[3] | 38.10 kg | 10.42 |
| B) | Aromatic Naphtha[4] | 38.10 kg | 11.55 |
| c) | Total Concentrate | 363.02 kg | 100.00 |
| (i) | Total Solids (T.S.): | 20.7% | — |
| (ii) | Total PANI[1] | 9.01% | — |
| (iii) | VOC (Volatile Organic Compounds): | 288.04 kg | — |

[1] "PANI" is poly(aniline) doped at pH 11.
[2] "DA 15" is a dispersant from Daniel Products containing 65% solids.
[3] "PMA" is propylene glycol methyl ether acetate.
[4] "Aromatic Naphtha 100" a is solvent from Eastman.

To form the desired paints, these concentrates were combined with other paint ingredients as illustrated in the following Tables 2 and 3 for an alkyd paint containing polyaniline doped to the desired level by treatment at pH 11 or 4 as described above.

TABLE 2

FORMULATION FOR ALKYD-PANI 11

| MATERIALS | AMOUNT (kg) | VOLUME PERCENT |
|---|---|---|
| I. Charge the Following to High Speed Dispersion | | |
| Alkyd Resin (Reichhold's 336–70 m) | 109.27 | 30.12 |
| Raw Linseed Oil | 38.01 | 10.85 |
| SD-1 (Rheological Additive) | 14.24 | 2.55 |
| Nytal 200 (Magnesium Silicate) | 64.14 | 5.95 |
| Concentrate - PANI | 95.07 | 26.20 |
| Mica 221 | 35.65 | 3.30 |
| CR-822 (Rutile Titanium Dioxide) | 59.92 | 3.95 |
| II. Grind in High Speed Disperser to Hegman 5+, Then let Down as Follows: | | |
| Raw Linseed Oil | 28.53 | 8.15 |
| Troysol AFL (Anti-Float Liquid) | 2.49 | 0.78 |
| Troymax Calcium 8% (dryer) | 1.00 | 0.28 |
| Troymax Cobalt 12% (dryer) | 1.00 | 0.25 |
| Troymax Zirconium 24% (dryer) | 1.00 | 0.21 |
| Troykyd Anti-Skin B | 1.00 | 0.35 |
| Mineral Spirits | 21.09 | 7.06 |
| III Total | 472.42 | 100.00 |

TABLE 3

ALKYD - PANI 11 PAINT FORMULATION ANALYSIS

| Parameter | Value |
|---|---|
| Total Solids: | 71.87% |
| Total Pigment: | 35.62% |
| Pigment/T.S.: | 49.56% |
| PANI 11/T.S.: | 2.52% |
| Theoretical Coverage: | 19.8 m²/L/25 micron |
| Weight per Gallon: | 1.25 kg/L |
| VOC (Volatile Organic Compound): | 3.40 kg/L |

The term total pigment in Table 3 refers to the sum of weights of materials with pigment-like physical properties including the polyaniline, the magnesium silicate, the Mica 221, and the titanium dioxide. Table 4 below lists the formulations prepared, and estimates the amount of polyaniline in each paint as a function of the percent of total solids (T.S.) in the dry coating. None of the paints listed exhibited a measureable conductivity.

TABLE 4

| Ex. No. | Type of PANI (pH) | Type of Coating | PANI[1] (T.S.) | PIG[3] (T.S.) | T.S.[2] (%) |
|---|---|---|---|---|---|
| Comp. Ex. 1 | — | Alkyd | 0.0 | 47.1 | 87.4 |
| Ex. 1 | PANI 11 | Alkyd-PANI 11 | 2.52 | 49.6 | 71.9 |
| Ex. 2 | PANI 11 | Alkyd-PANI 11 | 8.84 | 56.2 | 52.7 |

[1] "PANI" means polyaniline.
[2] "T.S." means total solids.
[3] "PIG" means pigament.

COMPARATIVE EXAMPLE 2

A series of experiments were carried out to demonstrate the superior corrosion protection provided by the paint of this invention and the electrical conductivity of the dried paint. The paints selected for evaluation were those of Examples 1 and 2 and Comparative Example 1.

The paints were applied to bare (white metal) sandblasted steel panels by spraying. The spraying was carried out in a manner to give a coating of a minimum thickness of about 0.005 cm. The electrical conductivity of the dried coating was evaluated by the four-in-line probe method. The coating exhibited no measurable electrical conductivity.

The corrosion resistance of the alkyd paints were tested by exposure of duplicate panels scribed in the lower third with an "X" to a salt fog (per the ASTM procedure B-117). The performance of the paints which contained polyaniline was compared to that of a formulation of Comparative Example 1 with no polyaniline and a commercially available alkyd primer from Carboline, GP818.

The panels were evaluated at 250 and 500 hours of exposure. Panels were evaluated for blistering (B), over all rust (OR) and scribe rust (SR).

Blistering evaluations were performed in accordance with ASTM D-714. Blister sizes were indicated by numbers (a "2" being the largest and an "8" the smallest), while blister frequency was indicated by few (F), medium (M), medium dense (MD), and dense (D). Overall rusting was evaluated in accordance with ASTM D-610. A value of "10" corresponds to no rust, while lower numbers correspond to increasingly greater amounts of rust. Rust at the scribe was evaluated in terms of measuring the amount of creepage from the center of the scribe cut.

The results of exposure for 250 hours are summarized in Table 5, and those for 500 hours of exposure in Table 6.

TABLE 5

SALT FOG, 250 HOURS

| Exp. No | Coatings | Panel | Blisters | Scribe Rust | Overall Rust |
|---|---|---|---|---|---|
| 1 | Comp. Ex. 1 | AS14 | 6MD (6D scribe) | <0.15 cm. | 4 |
| 2 | Comp. Ex. 1 | AS15 | 3F (6F scribe) | <0.15 cm. | 8 |
| 3 | Ex. 1 | AS31 | 6F (8MD scribe) | <0.15 cm. | 7 |
| 4 | Ex. 1 | AS32 | 6F (8MD scribe) | <0.15 cm. | 6 |
| 5 | Ex. 2 | AS37 | None | <0.15 cm. | 1 |
| 6 | Ex. 2 | AS38 | None | <0.15 cm. | 1 |
| 7 | GP818 | AS55 | 7MD (6M scribe) | <0.15 cm. | 2 |
| 8 | GP818 | AS56 | 7MD (6M scribe) | <0.15 cm. | 2 |

TABLE 6

SALT FOG, 500 HOURS

| Exp. No. | Coatings | Panel | Blisters | Scribe Rust | Overall Rust |
|---|---|---|---|---|---|
| 1 | Comp. Ex. 1 | AS14 | 4D | <0.15 cm. | 0 |
| 2 | Comp. Ex. 1 | AS15 | 4MD | <0.15 cm. | 5 |
| 3 | Ex. 1 | AS31 | 4D | <0.15 cm. | 2 |
| 4 | Ex. 1 | AS32 | 4D | <0.15 cm. | 2 |
| 5 | Ex. 2 | AS37 | (none scribe) 6F | <0.15 cm. | 0 |
| 6 | Ex. 2 | AS38 | (none scribe) 6F | <0.15 cm. | 0 |
| 7 | GP818 | AS55 | 4D | <0.15 cm. | 2 |
| 8 | GP818 | AS56 | 4D | <0.15 cm. | 2 |

EXAMPLES 3 and 4 and COMPARATIVE EXAMPLE 3

Vinyl based paints containing various amounts and forms of polyaniline were formulated to a specification which was similar to that given for Vinyl Primer #9 by the Steel Structures Painting Council (SSPC). The paints contained no corrosion preventive additives except for the polyaniline. The formulations differed from paint #9 in that they contained no lead oxide and no iron oxide. Rather they contained a mixture of titanium dioxide as the pigment and polyaniline as the conjugated backbone polymer. Polyaniline equilibrated at pH 11 was obtained as in Example 1. After drying the polyaniline was ball milled to form a concentrate tint base) as illustrated in Table 1 of Example 1.

TABLE 7

FORMULATION FOR VINYL-PANI 11

| MATERIALS | AMOUNT | VOLUME PERCENT |
|---|---|---|
| I. Charge the Following to medium speed dispersion | | |
| Xylol | 92.72 | 28.39 |
| VAGH (Solution Vinyl) | 21.32 | 4.06 |
| VMCH (Solution Vinyl) | 21.32 | 4.17 |
| Methylisobutylketone | 92.72 | 30.27 |
| II. Let Down as Follows and Grind in Pebble Mill to Hegman 6½+ | | |
| Dioctyl Phthalate | 8.75 | 2.36 |
| SD-2 (Rheological Aid) | 1.63 | 0.27 |
| Soya Lecithin | 1.91 | 0.49 |

TABLE 7-continued

FORMULATION FOR VINYL-PANI 11

| MATERIALS | AMOUNT | VOLUME PERCENT |
|---|---|---|
| Troysol (Antifloat liquid) | 1.22 | 0.39 |
| CR-800 (Rutile TiO$_2$) | 26.31 | 1.69 |
| Concentrate - PANI 11 | 101.33 | 27.92 |
| III. Total | 369.23 | 100.01 |

To form the desired paints, these concentrates were combined with other paint ingredients as illustrated in the following Tables 8 and 9 for a vinyl paint containing polyaniline doped to the desired level by treatment at pH 11 as described in Table 9.

TABLE 8

VINYL - PANI PAINT FORMULATION ANALYSIS

| Parameter | Value |
|---|---|
| Total Solid: | 27.78% |
| Total Pigment: | 9.60% |
| Pigment/T.S.: | 34.55% |
| PANI/T.S.: | 8.90% |
| Theoretical Coverage: | 5.93 m$^2$/L/25 micron |
| Weight Per Gallon: | 0.96 kg/L |
| VOC (Volatile Organic Compounds): | 0.71 kg/L |

The term total pigment in Table 8 refers to the sum of weights of materials with pigment-like physical properties including the polyaniline, the magnesium silicate, the mica, and the titanium dioxide. Table 9 below lists the formulations prepared, and estimates the amount of polyaniline in each paint as a function of the percent of total solids (T.S.) in the dry coating. The paint exhibited no measureable electrical conductivity.

TABLE 9

| Ex. No. | Type of PANI[1] (pH) | Type of Coating | PANI T.S.[2] | PIG T.S.[3] |
|---|---|---|---|---|
| Comp. Ex. 3 | — | Vinyl | 0.0% | 33.9% |
| Ex. 3 | PANI 11 | Vinyl-PANI 11 | 2.97% | 34.1% |
| Ex. 4 | PANI 11 | Vinyl-PANI 11 | 8.89% | 34.5% |

[1]."PANI" means polyaniline.
[2]."PANI T.S." means total polyaniline solids.
[3]."PIG T.S." means total pigment solids.

COMPARATIVE EXAMPLE 3

A series of experiments were carried out to demonstrate the superior corrosion protection provde by the paint of this invention and the electrical conductivity of the dried paint. The paints selected for evaluation were those of Examples 3 and 4, and of Comparative Example 3.

The paints were applied to bare (white metal) sandblasted steel panels by spraying. The spraying was carried out in a manner to give a coating of a minimum thickness of about 0.005 cm. The electrical conductivity of the dried coating was evaluated by the four-in-line probe method. The coatings exhibited no measurable electrical conductivity.

The corrosion resistance of the vinyl paints was tested by exposure of duplicate panels scribe in their lower third with an "X" to a salt fog (per the ASTM procedure B-117). Comparative the performance of the paints of Examples 3 and 4 which contained polyaniline, was compared to that of a formulation as in Comparative Example 3 with no polyaniline and a commercially available anti-corrosion vinyl primer from Carboline, Rust Bond 6C (CRB6C).

The coated steel panels were examined at 250 hours and at 500 hours. Evaluations were made according to ASTM procedures as described in Comparative Example 2. The results of exposure for 250 hours are summarized in Table 10 and those for 500 hours exposure in Table 11.

TABLE 10

SALT FOG, VINYLS, 250 HOURS

| Exp. No. | Coating | Panel | Blisters | Scribe Rust | Overall Rust |
|---|---|---|---|---|---|
| 1 | Comp. Ex. 3 | AS73 | 6F (2M scribe) | <0.15 cm | 8 |
| 2 | Comp. Ex. 3 | AS74 | 2M | <0.15 cm | 8 |
| 3 | Ex. 3 | AS91 | 8F (2M scribe) | <0.15 cm | 8 |
| 4 | Ex. 3 | AS92 | 8F (2M scribe) | <0.15 cm | 8 |
| 5 | Ex. 4 | AS97 | 8F (2M scribe) | <0.15 cm | 8 |
| 6 | Ex. 4 | AS98 | 8F (2F scribe) | <0.15 cm | 8 |
| 7 | CRB6C | AS117 | 6M (3D scribe) | <0.15 cm | 7 |
| 8 | CRB6C | AS118 | 5M (3D scribe) | <0.15 cm | 7 |

TABLE 11

SALT FOG, VINYLS, 500 HOURS

| Exp. No. | Coating | Panel | Blisters | Scribe Rust | Overall Rust |
|---|---|---|---|---|---|
| 1 | Comp. Ex. 3 | AS73 | 2M (2MD scribe) | <0.15 cm | 6 |
| 2 | Comp. Ex. 3 | AS74 | 2M (2MD scribe) | <0.15 cm | 6 |
| 3 | Ex. 3 | AS91 | 7F (2MD scribe) | <0.15 cm | 7 |
| 4 | Ex. 3 | AS92 | 7F (2MD scribe) | <0.15 cm | 7 |
| 5 | Ex. 4 | AS97 | 6D (2M scribe) | <0.15 cm | 8 |
| 6 | Ex. 4 | AS98 | 6D (2M scribe) | <0.15 cm | 8 |
| 7 | CRB6C | AS117 | 6M (8MD scribe) | <0.15 cm | 3 |
| 8 | CRB6C | AS118 | 6M (3MD scribe) | <0.15 cm | 2 |

What is claimed is:

1. An improved anti-corrosion paint comprising one or more polymeric binders dispersed in a liquid medium, said improvement comprising an anti-corrosion effective amount of one or more nonconductive conjugated polymers in addition to said polymeric binder wherein said one or more nonconductive conjugated polymer is a conjugated homopolymer or copolymer having an electrical conductivity of less than about $10^{-8}$ S/cm.

2. A paint according to claim 1 wherein said conjugated homopolymer or copolymer is a conjugated backbone homopolymer or copolymer.

3. A paint according to claim 2 wherein said conjugated backbone homopolymer or copolymer is a polyaniline.

4. A paint according to claim 3 wherein said polyaniline is derived from polymerizing an aniline of the Formula I:

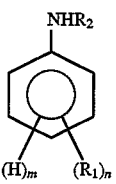

Formula I wherein:

n is an integer from 0 to 5;

m is an integer from 0 to 5, with the proviso that the sum of n and m is 5;

$R_1$ is the same or different at each occurrence and is phosphinic acid or a salt or ester thereof, phosphonic acid or a salt or ester thereof, sulfonic acid or a salt or ester thereof, boric acid or a salt or ester thereof, phosphoric acid or a salt or ester thereof, alkylamino, dialkylamino, arylamino, diarylamino, alkylarylamino, amino, hydroxy, sulfinic acid or a salt or ester thereof, nitro, carboxylic acid or a salt or ester thereof, halo, cyano, deuterium, or substituted or unsubstituted alkyl, alkenyl, alkoxy, cycloalkyl, cycloalkenyl, alkanoyl, alkylthio, alkynyl, aryloxy, alkylthioalkyl, alkylaryl, arylalkyl, alkylsulfinyl, alkoxyalkyl, alkylsulfonyl, alkylsulfonylalkyl, aryl, arylthio, arylsulfinyl, alkoxycarbonyl, alkylsilane, aryloxyalkyl or arylsulfonyl, wherein said substituents are one or more amino, alkylamino, dialkylamino, arylamino, diarylamino, phosphinic acid or a salt or ester thereof, alkylarylamino, phosphonic acid or a salt or ester thereof, sulfonic acid or a salt or ester thereof, boric acid or a salt or ester thereof, sulfinic acid or a salt or ester thereof, phosphoric acid or a salt or ester thereof, carboxylic acid or a salt or ester thereof, halo, nitro, hydroxy, cyano or epoxy moieties; or any two $R_1$ substituents or any one $R_1$ substituent and $R_2$ substituent taken together may form substituted or unsubstituted alkylene, alkynylene or alkenylene chain completing a 3, 4, 5, 6, 7, 8, 9 or 10 membered aromatic, heteroalicyclic, heteroaromatic or alicyclic carbon ring, which ring may optionally include one or more divalent ester, carbonyl, nitrogen, sulfur, sulfinyl, or a salt or ester thereof, sulfonyl or oxygen, wherein said alkylene, alkynylene or alkenylene substituents are one or more amino, alkylamino, phosphinic acid or a salt or ester thereof, dialkylamino, arylamino, diarylamino, alkylarylamino, phosphonic acid or a salt or ester thereof, sulfonic acid or a salt or ester thereof, boric acid or a salt or ester thereof, sulfinic acid or a salt or ester thereof, phosphoric acid or a salt or ester thereof, carboxylic acid or a salt or ester thereof, halo, nitro, hydroxy, cyano or epoxy moieties, or $R_1$ is an aliphatic moiety having repeat units of the formula:

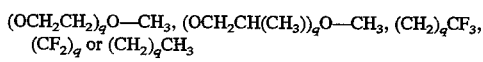

wherein q is a positive whole number; and $R_2$ is the same or different at each occurrence and is $R_1$ substitutents or hydrogen.

5. A paint according to claim 4 wherein the polyaniline comprises repeat units of the Formulas II and III:

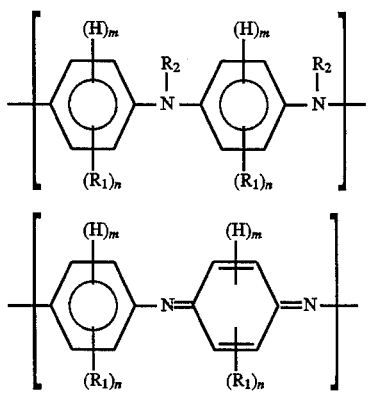

Formula II

Formula III or a combination thereof, wherein:

n and m are the same or different and are integers from 0 to 4 with the proviso that the sum of n and m is 5; and $R_1$ is the same or different at each occurrence and is phosphinic acid or a salt or ester thereof, phosphonic acid or a salt or ester thereof, sulfonic acid or a salt or ester thereof, boric acid or a salt or ester thereof, phosphoric acid or a salt or ester thereof, alkylamino, dialkylamino, arylamino, diarylamino, alkylarylamino, amino, hydroxy, sulfinic acid or a salt or ester thereof, nitro, carboxylic acid or a salt or ester thereof, halo, cyano, deuterium, or substituted ot unsubstituted alkyl, alkenyl, alkoxy, cycloalkyl, cycloalkenyl, alkanoyl, alkylthio, alkynyl, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, alkylsilane or arylsulfonyl, wherein said substituents are one or more amino, alkylamino, dialkylamino, arylamino, diarylamino, phosphinic acid or a salt or ester thereof, alkylarylamino, phosphonic acid or a salt or ester thereof, sulfonic acid or a salt or ester thereof, boric acid or a salt or ester thereof, sulfinic acid or a salt or ester thereof, phosphoric acid or a salt or ester thereof, carboxylic acid or a salt or ester thereof, halo, nitro, hydroxy, cyano, or epoxy moieties; or any two $R_1$ substituents or any one $R_1$ substituent and $R_2$ substituent taken together may form substituted or unsubstituted alkylene, alkynylene or alkenylene chain completing a 3, 4, 5, 6, 7, 8, 9 or 10 membered aromatic, heteroalicyclic, heteroaromatic or alicyclic carbon ring, which ring may optionally include one or more divalent ester, carbonyl, nitrogen, sulfur, sulfinyl, or a salt or ester thereof, sulfonyl or oxygen, wherein said alkylene, alkynylene or alkenylene chain substituents are one or more amino, alkylamino, phosphinic acid or a salt or ester thereof, dialkylamino, arylamino, diarylamino, alkylarylamino, phosphonic acid or a salt or ester thereof, sulfonic acid or a salt or ester thereof, or ester thereof, carboxylic acid or a salt or ester thereof, halo, nitro, hydroxy, cyano or epoxy moieties, or $R_1$ is an aliphatic moiety having repeat units of the formula:

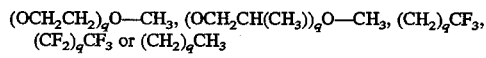

wherein q is a positive whole number; and $R_2$ is the same or different at each occurrence and is $R_1$ substituents or hydrogen.

6. A paint according to claim 5 wherein said homopolymer or copolymer is comprised of the Formula IV:

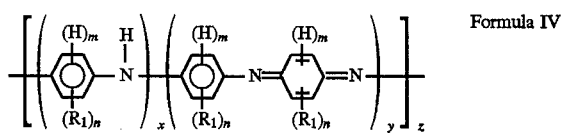

wherein:

x and y are the same or different at each occurrence and are integers equal to or greater than 0, with the proviso that the sum of x and y is greater than 0;

z is an integer equal to or greater than about 5;

n is an integer from 0 to 3;

m is an integer from 1 to 4, with the proviso that the sum of n and m is 4;

$R_1$ is the same or different at each occurrence and is alkyl, alkenyl, alkoxy, cycloalkyl, cycloalkenyl, alkanoyl, amino, alkylamino, dialkylamino, arylamino, diarylamino, alkylarylamino, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, phosphinic acid or a salt or ester thereof, phosphonic acid or a salt or ester thereof, alkylsilane, boric acid or a salt or ester thereof, arylsulfonyl, carboxylic acid ot a salt or ester thereof, halo, hydroxy, nitro, cyano, sulfonic acid or a salt or ester thereof, phosphoric acid or a salt or ester thereof or aryloxy, alkyl or alkoxy substituted with one or more sulfonic acid or a salt or ester thereof, carboxylic acid or a salt or ester thereof, phosphoric acid or a salt or ester thereof, boric acid or a salt or ester thereof, sulfinic acid or a salt or ester thereof, halo, nitro, cyano, epoxy, hydroxy, phosphinic acid or a salt or ester thereof, or phosphonic acid or a salt or ester thereof; or any two $R_1$ groups or any one $R_1$ group and $R_2$ group together may form a substituted or unsubstituted alkylene or alkenylene chain completing a 3, 4, 5, 6, 7, 8, 9 or 10 membered heteroaromatic, heteroalicyclic, aromatic or alicyclic carbon ring, which chain may optionally include one or more divalent nitrogen, ester, carbonyl, sulfur, sulfinyl, sulfonyl or oxygen group, wherein said alkylene or alkenylene chain substituents are one or more sulfonic acid or salt or ester thereof, carboxylic acid or salt or ester thereof, phosphoric acid or salt or ester thereof, boric acid or salt or ester thereof, sulfinic acid or salt or ester thereof, halo, nitro, cyano, epoxy, hydroxy, phosphinic acid or a salt or ester thereof, phosphinic acid or a salt or ester thereof or $R_1$ is an aliphatic moiety having repeat units of the formula:

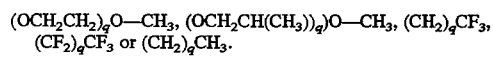

7. A paint according to claim 5 wherein $R_2$ is hydrogen.

8. A paint according to claim 6 wherein m is from 3 to 4 and n is zero.

9. A paint according to claim 8 wherein $R_1$ is the same or different at each occurrence and is selected from the group consisting of alkyl or alkoxy having from about 1 to about 12 carbon atoms, phosphonic acid or a salt or ester thereof, phosphinic acid or a salt or ester thereof, sulfonic acid or a salt or ester thereof, boric acid or a salt or ester thereof, and carboxylic acid or a salt or ester thereof.

10. A paint according to claim 9 wherein $R_1$ is the same or different at each occurrence and is alkyl or alkoxy having from 1 to about 6 carbon atoms or sulfonic acid or salt thereof.

11. A paint according to claim 10 wherein:

x is an integer equal to or greater than 2;

y is equal to or greater than 0; and z is an integer equal to or greater than about 5.

12. A paint according to claim 11 wherein:

y is an integer equal to or greater than 1 with the proviso that the ratio of x to y is equal to or greater than 1 and z is an integer equal to or greater than 5.

13. A paint according to claim 12 wherein m is 4 and n is 0;

y is equal to or greater than 1, with the proviso that the ratio of x to y is equal to or greater than about 1; and z is an integer equal to or greater than about 5.

14. A paint according to claim 13 wherein said polymeric binder is selected from the group consisting of alkyds, vinyl containing polymers, vinylidene chlorides, epoxies, fluoroepoxies, unsaturated polyester, thermosetting acrylics, phenolics, and polyurethanes.

15. A paint according to claim 14 wherein said polymeric binder is a vinyl containing polymer.

16. A coating comprising an anti-corrosion effective amount of one or more non-conductive conjugated polymers in a polymeric binder.

17. An improved anti-corrosion paint comprising one or more polymeric binders dispersed in a liquid medium, said improvement comprising an anti-corrosion effective amount of one or more nonconductive conjugated backbone homopolymer or copolymer in addition to said polymeric binder.

18. The paint of claim 17 wherein the conjugated backbone homopolymer or copolymer is a polyaniline derived from polymerizing an aniline of the Formula I:

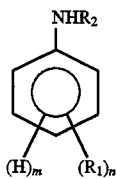

Formula I wherein:

n is an integer from 0 to 5;

m is an integer from 0 to 5, with the proviso that the sum of n and m is 5;

$R_1$ is the same or different at each occurrence and is phosphinic acid or a salt or ester thereof, phosphonic acid or a salt or ester thereof, sulfonic acid or a salt or ester thereof, boric acid or a salt or ester thereof, phosphoric acid or a salt or ester thereof, alkylamino, dialkylamino, arylamino, diarylamino, alkylarylamino, amino, hydroxy, sulfinic acid or a salt or ester thereof, nitro, carboxylic acid or a salt or ester thereof, halo, cyano, deuterium, or substituted or unsubstituted alkyl, alkenyl, alkoxy, cycloalkyl, cycloalkenyl, alkanoyl, alkylthio, alkynyl, aryloxy, alkylthioalkyl, alkylaryl, arylalkyl, alkylsulfinyl, alkoxyalkyl, alkylsulfonyl, alkylsulfonylalkyl, aryl, arylthio, arylsulfinyl, alkoxycarbonyl, alkylsilane, aryloxyalkyl or arylsulfonyl, wherein said substituents are one or more amino, alkylamino, dialkylamino, arylamino, diarylamino, phosphinic acid or a salt or ester thereof, alkylarylamino, phosphonic acid or a salt or ester thereof, sulfonic acid or a salt or ester thereof, boric acid or a salt or ester thereof, sulfinic acid or a salt or ester thereof, phosphoric acid or a salt or ester thereof, carboxylic acid or a salt or ester thereof, halo, nitro, hydroxy, cyano or epoxy moieties; or any two $R_1$ substituents or any one $R_1$ substituent and $R_2$ substituent taken together may form substituted or unsubstituted alkylene, alkynylene or alkenylene chain completing a 3, 4, 5, 6, 7, 8, 9 or 10 membered aromatic, heteroalicyclic, heteroaromatic or alicyclic carbon ring, which ring may optionally include one or more rivalent ester, carbonyl, nitrogen, sulfur, sulfinyl, or a salt or ester thereof, sulfonyl or oxygen, wherein said alkylene, alkynylene, or alkenylene substituents are one or more amino, alkylamino, phosphinic acid or a salt or ester thereof, dialkylamino, arylamino, diarylamino, alkylarylamino, phosphonic acid or a salt or ester thereof, sulfonic acid or a salt or ester thereof, boric acid or a salt or ester thereof, sulfinic acid or a salt or ester thereof, phosphoric acid or a salt or ester thereof, carboxylic acid or a salt or ester thereof, halo, nitro, hydroxy, cyano or epoxy moieties, or $R_1$ is an aliphatic moiety having repeat units of the formula:

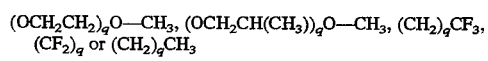

wherein q is a positive whole number; and $R_2$ is the same or different at each occurrence and is $R_1$ substitutents or hydrogen.

* * * * *